United States Patent [19]
Wintering et al.

[11] Patent Number: 5,441,202
[45] Date of Patent: Aug. 15, 1995

[54] MISTING SYSTEM WITH IMPROVED COUPLERS

[76] Inventors: Gary F. Wintering, 15846 S. 13th Way, Phoenix, Ariz. 85048; Thomas A. Bontems, 1909 E. Palmcroft, Tempe, Ariz. 85282

[21] Appl. No.: 230,326

[22] Filed: Apr. 20, 1994

[51] Int. Cl.⁶ .............................. A01G 15/00
[52] U.S. Cl. ......................... 239/267; 239/570; 285/322; 137/107; 137/517
[58] Field of Search ............. 239/266, 267, 533.1, 239/533.15, 548, 550, 566, 570, 583; 285/322, 323, 156; 137/107, 517, 539

[56] References Cited

U.S. PATENT DOCUMENTS

| | | | |
|---|---|---|---|
| 385,069 | 6/1888 | Richardson | 239/267 |
| 1,390,047 | 9/1921 | Lange | 239/267 |
| 4,606,783 | 8/1986 | Guest | 285/323 |
| 4,700,732 | 10/1987 | Francisco | 137/107 |
| 4,830,046 | 5/1989 | Holt | 137/517 |
| 4,909,270 | 3/1990 | Enterante, Sr. et al. | 137/107 |
| 5,171,045 | 12/1992 | Pasbrig | 285/322 |
| 5,230,539 | 7/1993 | Olson | 285/323 |
| 5,330,104 | 7/1994 | Marcus | 239/266 |

*Primary Examiner*—Karen B. Merritt
*Attorney, Agent, or Firm*—Jordan M. Meschkow; Lowell W. Gresham; Mark M. Takahashi

[57] ABSTRACT

A misting system including a locking T coupler with an elongated tubular body having a first end defining an axially extending chamber therein with sidewalls that taper radially outwardly from adjacent the first end toward the center of the body. A tubular ferrule is designed to axially nest within the first end of the body with a first end of the ferrule positioned in the chamber for receiving a supply tube coaxially in a second end thereof. The first end of the ferrule further including axially extending fingers with radially outwardly extending portions positioned to engage the tapered sidewalls of the chamber and force the fingers radially inwardly into a tube gripping position as the ferrule is partially withdrawn from the body so as to tightly grip a supply tube positioned therein and prevent the withdrawal of the supply tube from the ferrule. An automatic drain valve is designed to include a check valve and either be engaged in the ferrule or to be threadedly engaged in a nozzle opening of the misting system.

5 Claims, 2 Drawing Sheets

5,441,202

MISTING SYSTEM WITH IMPROVED COUPLERS

BACKGROUND OF THE INVENTION

1. Field of the Invention

This invention relates to misting systems.

More particularly, the present invention relates to misting systems for use in cooling outdoor areas in dry climates.

2. Prior Art

Misting systems are becoming very popular in dry climate areas in which the rapid evaporation of mist or moisture is capable of quickly and efficiently cooling outdoor areas, such as private and commercial patios, outdoor restaurants, etc. The major problem is that the prior art misting systems are not adjustable to easily and quickly change the direction in which the mist is pointed. Also, when prior art misting systems are shut down the water generally must either remain in the system or drain out through some or all of the misting nozzles. If the water remains in the system it has a tendency to eventually foul the system with particles, i.e. minerals, impurities, etc, so that constant maintenance is required to clean spray nozzles and other components. Further, once the water in the system evaporates and leaves impurities or turns foul without evaporating, some of the impurities will be contained in the mist during the next operation and will cause, at least initially, bad smells and distribution of the impurities into the air, which can result in health problems. Also, after repeated uses, impurities in the water eventually inhibit flow of water through the spay head, impairing the proper functioning of the misting system.

It would be highly advantageous, therefore, to remedy the foregoing and other deficiencies and problems inherent in the prior art.

Accordingly, it is an object of the present invention to provide a new and improved misting system.

Another object of the present invention is the provision of a misting system that is easy to install and adjust during operation.

And another object of the invention is to provide a misting system that is easy to drain, subsequent to operation.

Still another object of the present invention is the provision of a misting system that is relatively inexpensive to install and use.

Yet another object of the present invention is the provision of a misting system that is relatively inexpensive to manufacture.

And still another object of the invention is the provision of a misting system that is completely adjustable during operation.

And a further object of the present invention is the provision of a misting system that is easily and quickly customized to virtually any outdoor area.

Still a further object of the present invention is the provision of a misting system that can be easily and completely drained to reduce maintenance requirements and the occurrence of foul smelling mist.

SUMMARY OF THE INVENTION

Briefly, to achieve the desired objects of the instant invention, in accordance with a preferred embodiment thereof, first provided is a misting system including a locking T coupler with an elongated tubular body having a first end defining an axially extending chamber therein with sidewalls that taper radially outwardly from adjacent the first end to a position spaced axially inwardly from the first end toward a center portion of the body. A tubular ferrule is designed to axially nest within the first end of the body with a first end of the ferrule positioned in the chamber for receiving a supply tube coaxially in a second end thereof. The first end of the ferrule further including axially extending fingers with radially outwardly extending portions positioned to engage the tapered sidewalls of the chamber and force the fingers radially inwardly into a tube gripping position as the ferrule is partially withdrawn from the body so as to tightly grip a supply tube positioned therein and prevent the withdrawal of the supply tube from the ferrule. An automatic drain valve is designed to include a check valve and either be engaged in the ferrule or to be threadedly engaged in a nozzle opening of the misting system.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which.

DETAILED DESCRIPTION OF THE PREFERRED EMBODIMENTS

Figure 1:
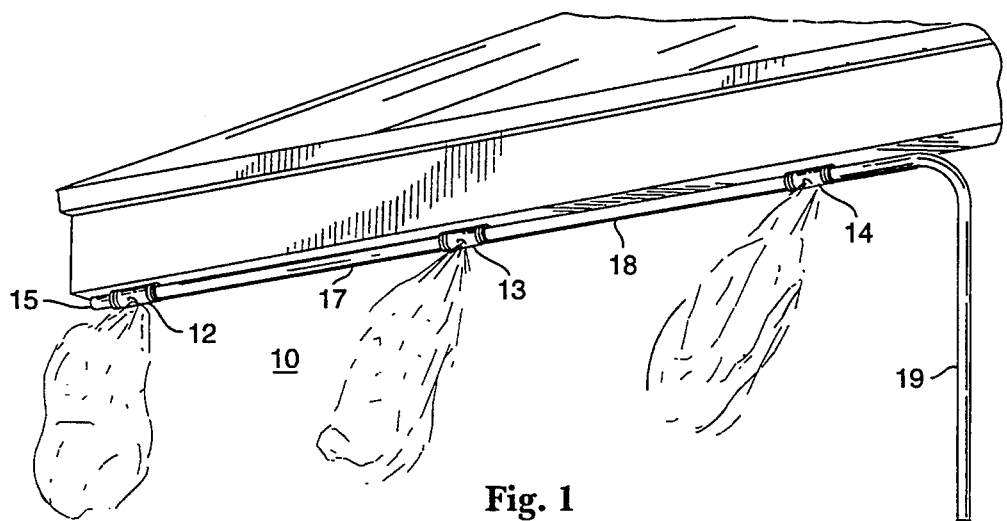
FIG. 1 is a perspective view of a misting system in accordance with the present invention.

Referring specifically to FIG. 1, a misting system 10 is illustrated including a plurality of locking T couplers 12, 13 and 14 and an automatic drain valve 15. Each of the locking T couplers has a first and a second end and a misting nozzle engaged in a nozzle opening midway therebetween (to be explained in detail presently). Automatic drain valve 15 is engaged in the first end of coupler 12, for draining misting system 10, as will also be explained presently. One end of a tubing or hose section 17 is engaged in the second end of coupler 12 and the other end of tubing section 17 is engaged in the first end of coupler 13. Similarly, one end of a tubing or hose section 18 is engaged in the second end of coupler 13 and the second end of tubing section 18 is engaged in the first end of coupler 14. One end of a section of feedline tubing 19 is engaged in the second end of coupler 14 and the other end has a female adapter 20 for engaging the male end of a supply hose 22.

In this instance, supply hose 22 is a simple garden hose or the like but it will be understood that other supply lines, or permanent lines, can be used in place thereof. Also, while only three locking T couplers are illustrated in misting system 10 it will be understood that any desired number may be utilized, as long as they are compatible with the pressure of the supply line. Also, it should be noted that couplers 12, 13 and 14 are preferably mounted on the underside or on the face of a support, such as a beam, roof fascia, etc. so that they can be easily and quickly directed in any desired direction.

Figure 2:
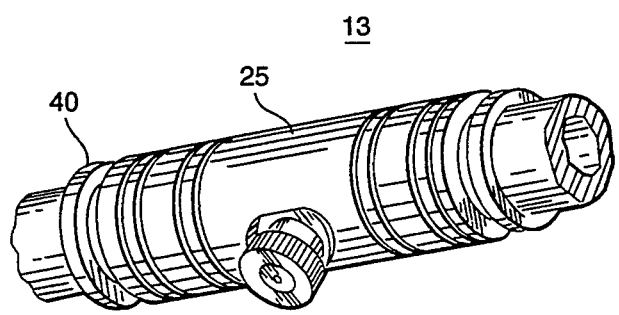
FIG. 2 is an enlarged perspective view of a portion of the misting system of FIG. 1.
Figure 3:
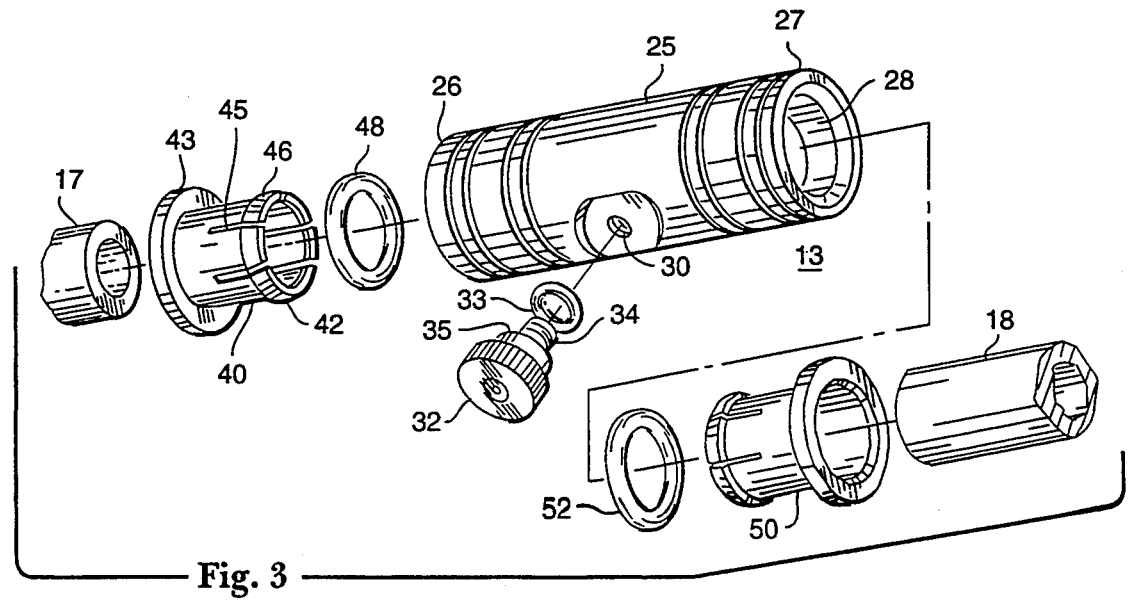
FIG. 3 is an exploded view in perspective of the portion of the misting system illustrated in FIG. 2.

Because locking T couplers 12, 13 and 14 are all substantially similar, only coupler 13 will be discussed in conjunction with FIGS. 2 through 6. Referring specifically to FIGS. 2 and 3, coupler 13 includes an elongated body 25 having a first end 26 and a second end 27 with a fluid conducting opening 28 extending therebetween. A nozzle opening 30 extends through the side of body 25 midway between ends 26 and 27 and has internal threads therein for threadedly receiving a standard misting nozzle 32. An O-ring 33 is positioned around a threaded portion 34 of nozzle 32 and is sandwiched between body 25 and a shoulder 35 of nozzle 32, with nozzle 32 tightly threaded into nozzle opening 30, to prevent water leakage around nozzle 32.

Coupler 13 further includes a tubular ferrule 40 with a plurality of axially extending fingers 42 defining one end and a radially outwardly extending collar 43 defining an opposite end. In this specific embodiment, fingers 42 are formed by cutting axially, or longitudinally, extending slots 45 from the end of ferrule 40 substantially to the middle thereof. Each finger 42 further has a radially outwardly extending portion 46 with the outer edge tapered slightly toward the end of ferrule 40 for the easy insertion of ferrule 40 into fluid conducting opening 28 at end 26. An O-ring 48 is provided to fit within opening 28 of end 26 prior to the insertion of ferrule 40, as will be explained in more detail presently.

In a similar fashion, a ferrule 50 and O-ring 52 are provided to fit within opening 28 at end 27 of body 25. Ferrule 50 is substantially similar to ferrule 40 and will not be discussed in detail. Ferrule 40 is designed to receive tubing section 17 removably engaged therein and ferrule 50 is designed to receive tubing section 18 removably engaged therein as will be more apparent from the following description.

Figure 4:
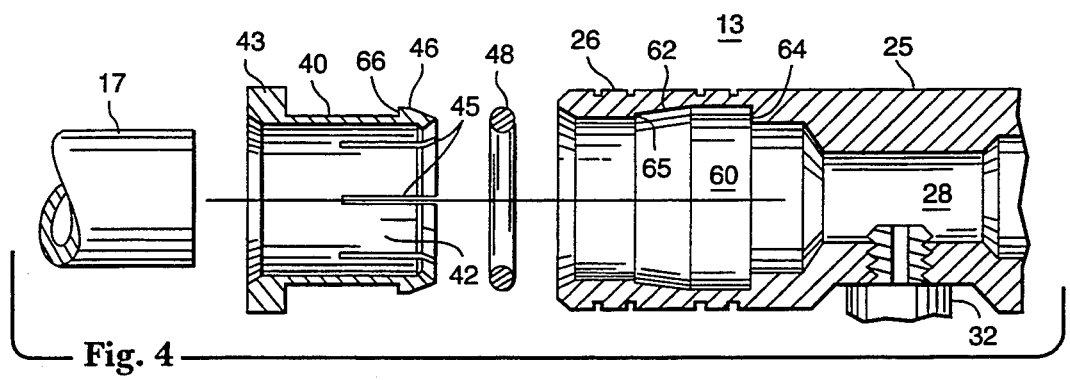
FIG. 4 is a sectional view of the portion of the misting system illustrated in FIG. 2 in an unassembled position.
Figure 5:
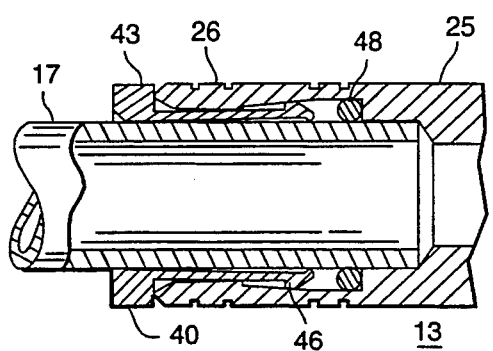
FIG. 5 is a sectional view similar to FIG. 4 with the components of the portion in a partially assembled position.
Figure 6:
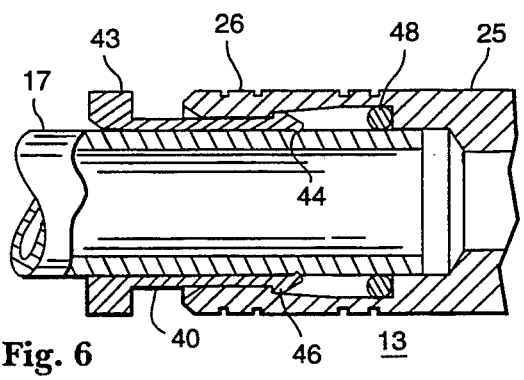
FIG. 6 is a sectional view similar to FIG. 5 with the components in a completely assembled position.

Referring specifically to FIGS. 4, 5 and 6, sectional views of coupler 13 are provided to better illustrate the internal construction thereof. End 26 of body 25 defines an axially extending chamber 60 therein with tapered sidewalls 62 that taper radially outwardly from adjacent first end 26 of body 25 to a position spaced axially inwardly from first end 26 toward a center portion of body 25. A radially inwardly extending shoulder 64 is positioned near an inner end of chamber 60 and a second radially extending shoulder 65 is positioned near an outer end of chamber 60.

As can be seen more clearly in FIG. 5, to engage tubing section 17 into locking T coupler 13, tubing section 17 is inserted axially through ferrule 40 and O-ring 48. The end of tubing section 17 is then inserted into opening 28 of body 25 at end 26. As the end of ferrule 40 engages end 26 of body 25, the slightly tapered outer edge of radially outwardly extending portion 46 forces the ends of fingers 42 radially inwardly. Tubing section 17 is inserted until it butts against the inside end of chamber 60, in which position O-ring 48 is against shoulder 64 and collar 43 is abutting the edge of housing 25. In this position, the diameter of chamber 60 is large enough to allow fingers 42 to spring outwardly into their normal position. At this point tubing section 17 is not fixedly engaged in body 25 and could be withdrawn if ferrule 40 is held in the position illustrated in FIG. 5.

To fix tubing section 17 within body 25, ferrule 40 is partially withdrawn, as illustrated in FIG. 6. As ferrule 40 and tubing section 17 are withdrawn together, tapered sidewalls 62 gradually force fingers 42 radially inwardly into a gripping position of tubing section 17. Finally, a rearwardly directed shoulder 66 of outwardly extending portion 46 engages radially inwardly directed shoulder 65 of body 25 and prevents further withdrawal of ferrule 40. Also, at this point fingers 42 are gripping tubing section 17 sufficiently tightly to prevent further withdrawal thereof. In this specific embodiment fingers 42 are formed with radially inwardly extending catches 44 which sink into the outer surface of tubing section 17 to prevent axial movement thereof. Thus, tubing section 17 is fixedly engaged in end 26 of body 25 of coupler 13 and O-ring 48 prevents the leakage of water therebetween.

To disassemble tubing section 17 from coupler 13, ferrule 40 is pushed back into the position illustrated in FIG. 5 and tubing section 17 is withdrawn while ferrule 40 is held in this position. It should be noted that catches 44 may actually score the surface of tubing section 17 so that in the event of leaking, etc. tubing section 17 (and all of the other tubing sections) can be checked to ensure that they were correctly and sufficiently engaged within the locking T couplers.

It should also be noted that coupler 13 can be easily rotated, while engaged with tubing section 17 and relative to tubing section 17, about the axis thereof to direct spray or mist, from misting nozzle 32 in substantially any direction. Further, misting system 10 can be easily disassembled for cleaning, storage, etc. or can be easily reassembled in different configurations to quickly and easily fit substantially any desired application.

Figure 7:
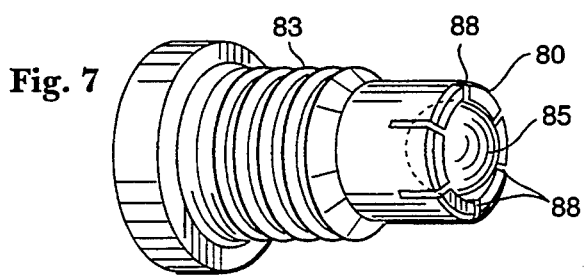
FIG. 7 is an enlarged perspective view of another portion of the misting system of FIG. 1.
Figure 8:
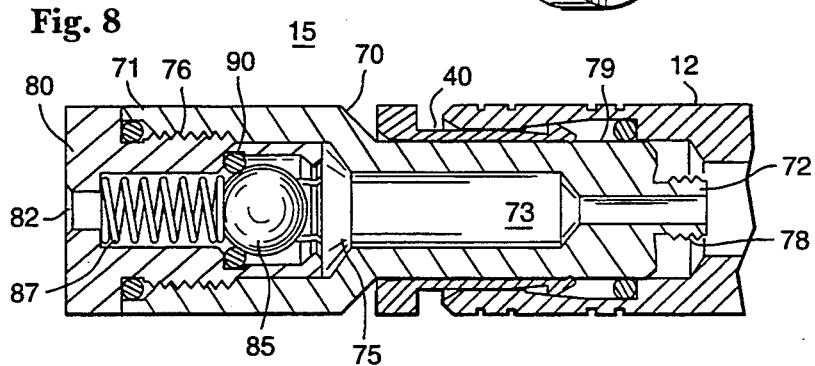
FIG. 8 is an enlarged sectional view of an automatic drain valve in the misting system of FIG. 1, in a pressurized mode of operation.
Figure 9:
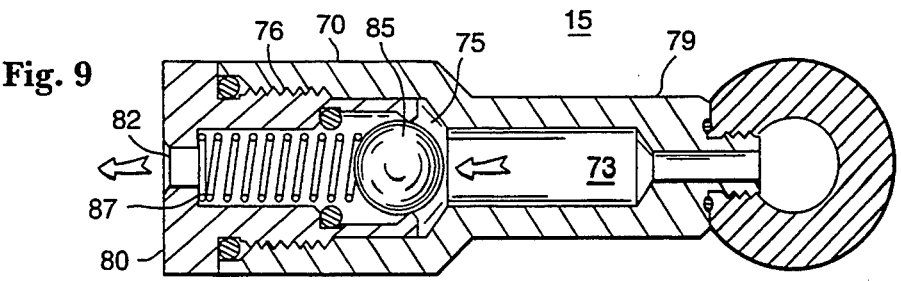
FIG. 9 is an enlarged sectional view similar to FIG. 8 with the automatic drain valve assembled in a different portion of the misting system, and in an unpressurized mode of operation.

Referring specifically to FIGS. 7 and 8, automatic drain valve 15 is illustrated in more detail. Drain valve 15 includes an elongated tubular body 70 with first and second ends 71 and 72, respectively, and a fluid conducting opening 73 extending therebetween. First end 71 defines an axially extending chamber 75 with internally threaded sidewalls 76. Second end 72 has external threads 78 for threadedly engaging second end 72 of automatic drain valve 15 in a nozzle opening (e.g. 30) of misting system 10, as illustrated in FIG. 9. Drain valve 15 also has a portion 79 of the outer surface formed in a tubular fashion similar to tubing section 17. Because of this novel construction, drain valve 15 can be engaged in either end of any one of locking T couplers 12, 13, or 14 in a fashion similar to the engagement of tubing section 17, explained above. For example, in FIG. 8 drain valve 15 is engaged in the first end of locking T coupler 12 utilizing the ferrule and O-ring as explained above.

A tubular check valve assembly 80, with a fluid conducting opening 82 extending therethrough (illustrated in FIG. 7), is threadedly engaged in chamber 75. Assembly 80 has external threads 83 formed in an outer surface thereof and designed to threadedly engage threaded sidewalls 76 of chamber 75 so that fluid conducting opening 82 of tubular check valve 80 is in fluid communication with fluid conducting opening 73 of tubular body 70. Tubular check valve 80 further includes a ball 85 positioned in fluid conducting opening 82 for movement between a misting system unpressurized position (illustrated in FIG. 9) in which fluid conducting opening 82 of tubular check valve 80 is open to conduct water therethrough and a misting system pressurized position (illustrated in FIG. 8 in which ball 85 closes fluid conducting opening 82 of tubular check valve 80 to the flow of water therethrough. A helical compression spring 87 is positioned in fluid conducting opening 82 and engaged with ball 85. Spring 87 normally biases ball 85 into the position illustrated in FIG. 9 when misting system 10 is unpressurized. In this position water is free to flow through opening 82 by way of slots 88 formed in check valve 80.

When misting system 10 is pressurized, the water pressure drives ball 85 against spring 87 until ball 85 engages an O-ring 90 in check valve 80. Ball 85 is held in a water sealing position against O-ring 90 and prevents water from egressing through opening 82. Thus, when misting system 10 is pressurized all of the water must exit only through misting nozzles in locking T couplers 12, 13 and 14. When misting system 10 is unpressurized, spring 87 moves ball 85 to the position illustrated in FIG. 9 and any water remaining in the system is drained through opening 82. Automatic drain valve 15 is conveniently constructed so that it can be placed in a low spot in the misting system, either in one end of a locking T coupler or in a nozzle opening in a locking T coupler.

Accordingly, a new and improved misting system is disclosed which is easy to install and adjust during operation. Further, the misting system can be easily and completely drained subsequent to operation to reduce maintenance requirements, clogging and the occurrence of foul smelling mist, etc. Also, the misting system is easily and quickly customized to virtually any outdoor area. The misting system is relatively inexpensive to install and use and is relatively inexpensive to manufacture.

Various modifications and changes to the embodiments herein chosen for purposes of illustration will readily occur to those skilled in the art. For example, additional or fewer fingers 42 and/or radially outwardly extending portions 46 could be utilized if desired. Also, while a variety of stops and shoulders are illustrated and explained it will be understood that some of these might be eliminated or changed to different embodiments if desired.

The foregoing is given by way of example only. Other modifications and variations may be made by those skilled in the art without departing from the scope of the invention as defined by the following claims.

Having fully described and disclosed the present invention and preferred embodiments thereof in such clear and concise terms as to enable those skilled in the art to understand and practice same, the invention claimed is:

1. An automatic drain valve for a misting system comprising:
   an elongated tubular body with first and second ends and a fluid conducting opening extending therebetween, the first end defining an axially extending chamber with internally threaded sidewalls and the second end having external threads for threadedly receiving the second end of the automatic drain valve in an internally threaded nozzle opening of said misting system, said first end being downward of the fluid flow; and
   a tubular check valve with a fluid conducting opening extending therethrough, the tubular check valve having external threads on an outer surface thereof designed to be threadedly received in the axially extending chamber of the first end of the body so that the fluid conducting opening of the tubular check valve is in fluid communication with the fluid conducting opening of the tubular body, the tubular check valve further including a ball positioned in the fluid conducting opening for movement between a misting system unpressurized position in which the fluid conducting opening of the tubular check valve is open to conduct water therethrough and a misting system pressurized position in which the ball closes the fluid conducting opening of the tubular check valve to the flow of water therethrough, and a spring engaged with the ball and normally biasing the ball into the misting system unpressurized position.

2. A misting system comprising:
   a locking T coupler including:
      an elongated tubular body with first and second ends and a fluid conducting opening extending therebetween,
      the first end defining an axially extending chamber therein with tapered sidewalls that taper radially outwardly from adjacent the first end to a position spaced axially inwardly from the first end toward a center portion of the body,
      a tubular ferrule with first and second ends,
      the ferrule being designed to axially nest within the first end of the body with the first end of the ferrule positioned in the axially extending chamber and to selectively receive a supply tube coaxially in the second end thereof,
      the first end of the ferrule further including axially extending fingers with radially outwardly extending portions positioned to engage the tapered sidewalls of the axially extending chamber and force the axially extending fingers radially inwardly into a tube gripping position as the tubular ferrule is partially withdrawn from the first end of the body so as to tightly grip a supply tube positioned therein and prevent the withdrawal of the supply tube from the second end of the ferrule,
      the elongated tubular body being axially rotatable about the tubular ferrule and including a nozzle opening midway between the first and second ends, which nozzle opening moves with the rotation of the body; and
   an automatic drain valve including:
      an elongated tubular body with first and second ends and a fluid conducting opening extending therebetween;
      the first end defining an axially extending chamber with internally threaded sidewalls,
      the second end having external threads for threadedly receiving the second end of the automatic drain valve selectively in said nozzle opening or another nozzle opening of said misting system,
      a tubular check valve with a fluid conducting opening extending therethrough,
      the tubular check valve having external threads on an outer surface thereof designed to be threadedly received in the axially extending chamber of the first end of the body of said drain valve so that the fluid conducting opening of the tubular check valve is in fluid communication with the fluid conducting opening of the tubular body of said drain valve, the tubular check valve further including a ball positioned in the fluid conducting opening for movement between a misting system unpressurized position in which the fluid conducting opening of the tubular check valve is open to conduct water therethrough and a misting system pressurized position in which the ball closes the fluid conducting opening of the tubular check valve to the flow of water therethrough, and a spring engaged with the ball and normally biasing the ball into the misting system unpressurized position.

3. A locking T coupler for a misting system as claimed in claim 2 wherein the nozzle opening has internal threads therein for threadedly receiving a misting nozzle.

4. A misting system as claimed in claim 2 wherein a fluid conducting opening extends between the first and second ends of the tubular ferrule, an outer surface of the second end of the tubular body being formed to fit coaxially within the second end of the tubular ferrule with the fluid conducting opening of the check valve being in fluid communication with the fluid conducting opening in the tubular ferrule.

5. A misting system comprising:

a locking T coupler including:

an elongated tubular body with first and second ends and a fluid conducting opening extending therebetween, said first and second ends each adapted for receiving and holding a supply tube therein;

the elongated tubular body being axially rotatable about a supply tube or between two supply tubes, and including a nozzle opening midway between the first and second ends, which nozzle opening moves with the rotation of the body; and an automatic drain valve including means for attaching said drain valve to said locking T coupler wherein said drain valve moves between a misting system unpressurized position in which the drain valve opens to conduct water therethrough and a misting system pressurized position in which the drain valve closes the flow of water therethrough.

* * * * *